(12) United States Patent
Voelz et al.

(10) Patent No.: US 11,370,440 B2
(45) Date of Patent: Jun. 28, 2022

(54) METHOD AND DEVICE FOR DETERMINING AN IDEALIZED PASSING MANEUVER

(71) Applicant: Robert Bosch GmbH, Stuttgart (DE)

(72) Inventors: Benjamin Voelz, Leonberg (DE);
Matthias Maier, Weissach (DE);
Matthias Haug, Renningen (DE);
Michael Gabb, Gaeufelden (DE);
Ruediger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 16/720,377

(22) Filed: Dec. 19, 2019

(65) Prior Publication Data

US 2020/0198638 A1 Jun. 25, 2020

(30) Foreign Application Priority Data

Dec. 20, 2018 (DE) .......................... 102018222670.9

(51) Int. Cl.
*B60W 30/18* (2012.01)
*B60W 50/00* (2006.01)

(52) U.S. Cl.
CPC .. *B60W 30/18163* (2013.01); *B60W 50/0097* (2013.01); *B60W 2520/10* (2013.01); *B60W 2556/45* (2020.02)

(58) Field of Classification Search
CPC ....... B60W 30/18163; B60W 50/0097; B60W 2520/10; B60W 2556/45; B60W 60/00276; B60W 30/0956; B60W 2554/4041; B60W 2554/4042; B60W 40/04; G08G 1/167

See application file for complete search history.

(56) References Cited

U.S. PATENT DOCUMENTS 9,008,890 B1 *  4/2015  Herbach ............... B60W 40/04
                                                701/26
10,235,882 B1 *  3/2019  Aoude ................. G08G 1/0137
10,831,210 B1 * 11/2020  Kobilarov .......... B60W 60/0011
(Continued)

FOREIGN PATENT DOCUMENTS

DE  102011111895 A1   2/2013
DE  102015006138 A1  11/2016
JP     2018195289 A * 12/2018 ............ B60W 30/08

*Primary Examiner* — Donald J Wallace
*Assistant Examiner* — Daniel M. Robert
(74) *Attorney, Agent, or Firm* — Norton Rose Fulbright US LLP; Gerard Messina

(57) ABSTRACT

A method for determining an idealized passing maneuver includes receiving first data values that represent a passing maneuver of a first vehicle to pass a second vehicle, requesting and receiving surroundings data values that represent instantaneous and/or future surroundings of the first vehicle and/or of the second vehicle, determining a surroundings model of the first vehicle based on the surroundings data values and on a digital map that represents the instantaneous and/or future surroundings of the first vehicle and/or of the second vehicle, determining an idealized passing maneuver for the first vehicle to carry out the passing maneuver based on the surroundings model, and providing the idealized passing maneuver in the form of second data values for receipt by the first vehicle.

12 Claims, 2 Drawing Sheets

(56) References Cited

U.S. PATENT DOCUMENTS

| | | | |
|---|---|---|---|
| 2011/0130894 A1* | 6/2011 | Kim | G08G 1/096844 |
| | | | 701/2 |
| 2011/0307121 A1* | 12/2011 | Matsuoka | G08G 1/161 |
| | | | 701/1 |
| 2015/0070194 A1* | 3/2015 | Jo | G08G 1/167 |
| | | | 340/905 |
| 2015/0353094 A1* | 12/2015 | Harda | B60W 30/18163 |
| | | | 701/23 |
| 2016/0200317 A1* | 7/2016 | Danzl | B60W 10/10 |
| | | | 701/25 |
| 2016/0280265 A1* | 9/2016 | Hass | B62D 15/0265 |
| 2017/0268896 A1* | 9/2017 | Bai | G08G 1/0141 |
| 2018/0047287 A1* | 2/2018 | Shimotsuma | G06V 20/58 |
| 2018/0345963 A1* | 12/2018 | Maura | G05D 1/0088 |
| 2020/0013283 A1* | 1/2020 | Sato | G08G 1/0969 |
| 2020/0098255 A1* | 3/2020 | Graham | G08G 1/096791 |
| 2020/0279481 A1* | 9/2020 | Kondo | G08G 1/09685 |
| 2021/0031800 A1* | 2/2021 | Fuchs | B60W 60/0027 |

\* cited by examiner

METHOD AND DEVICE FOR DETERMINING AN IDEALIZED PASSING MANEUVER

CROSS-REFERENCE TO RELATED APPLICATIONS

The present application claims priority under 35 U.S.C. § 119 to DE 10 2018 222 670.9 filed in the Federal Republic of Germany on Dec. 20, 2018, the content of which is hereby incorporated by reference herein in its entirety.

FIELD OF THE INVENTION

The present invention relates to, among other things, a method for determining an idealized passing maneuver including receiving first data values that represent a passing maneuver of a first vehicle, requesting and receiving surroundings data values that represent instantaneous and/or future surroundings of the first and/or second vehicle(s), determining a surroundings model of the first vehicle as a function of the surroundings data values, determining the idealized passing maneuver for the first vehicle for the purpose of carrying out the passing maneuver, and providing the idealized passing maneuver in the form of second data values in such a way that the first vehicle is able to receive the second data values.

SUMMARY

The method according to the present invention for determining an idealized passing maneuver includes a step of receiving first data values that represent a passing maneuver of a first vehicle, a second vehicle to be passed being passed using the passing maneuver, and a step of requesting and receiving surroundings data values that represent instantaneous and/or future surroundings of the first vehicle and/or of the second vehicle. The method furthermore includes a step of determining a surroundings model of the first vehicle as a function of the surroundings data values and based on a digital map that represents the instantaneous and/or future surroundings of the first and/or second vehicle(s). The method furthermore includes a step of determining the idealized passing maneuver for the first vehicle for the purpose of carrying out the passing maneuver, as a function of the surroundings model, and a step of providing the idealized passing maneuver in the form of second data values in such a way that the first vehicle is able to receive the second data values.

A passing maneuver can be, for example, a passing maneuver that has already started in that the first vehicle changes a lane to pass the second vehicle (for example on a roadway having multiple driving lanes per travel direction), or in that the first vehicle veers into an oncoming lane to pass the second vehicle. The passing maneuver has not been completed yet in any case, and, in an example embodiment, the passing maneuver can still be aborted. In an example embodiment, a passing maneuver is, for example, a passing maneuver that has not been started yet—for example in that the first vehicle is still located behind the second vehicle—but is to be started by the first vehicle. This is indicated, for example, in that the first vehicle rapidly reduces the distance between the first and the second vehicle and/or in that the first vehicle already indicates by using the turn signal and/or other means that a passing maneuver is to be carried out. In an example embodiment, the first vehicle is designed as an automated vehicle and the passing maneuver is indicated as a future passing maneuver in that a corresponding message is transmitted to the device and/or to the second vehicle.

An idealized passing maneuver is, for example, a passing maneuver that is carried out in such a way that none of the participating vehicles and/or none of the other road users (bicycle riders, pedestrian, etc.) are harmed as a result of the passing maneuver. In an example embodiment, an idealized passing maneuver is additionally or alternatively to be understood to mean a passing maneuver that is carried out in such a way that no occupant in the first vehicle feels unsafe in the process, for example. This can be ensured, for example, in that the acceleration or braking operations are not carried out excessively abruptly and/or the distances (prior to and following the passing maneuver) between the first and the second vehicle are maintained.

Instantaneous surroundings are, for example, the surroundings that can be detected by the first vehicle at the point in time of carrying out the method using a surroundings sensor system of the first vehicle and/or can be detected by a first and/or second infrastructure unit(s) using a first and/or second surroundings sensor system(s).

In an example embodiment, instantaneous surroundings are, for example, understood to mean a predefined area having a minimum size around the first vehicle and/or an area along the traffic way, on which the idealized passing maneuver is carried out. Future surroundings are the surroundings that the first vehicle will drive through in the course of the passing maneuver. The latter can be determined as a function of a first speed of the first vehicle, for example. The future surroundings preferably correspond to an area in which the passing maneuver is completed (for example in that the first vehicle returns to the same driving lane ahead of the second vehicle). In an example embodiment, future surroundings are the surroundings that can be detected by a third infrastructure unit using a third surroundings sensor system.

A surroundings model is, for example, a two- or three-dimensional model that simulates, based on a digital map and as a function of surroundings data values representing in particular the instantaneous and/or future surroundings, how a passing maneuver can be carried out.

The first and/or second vehicle(s) is/are a manually operated (designed according to SAE Level Zero) and/or an automated vehicle (designed according to one of SAE Levels 1 through 5) (see SAE J3016 Standard).

A digital map is a map that is present in the form of (map) data values on a memory medium. This map is designed, for example, in such a way that one or multiple map layers are included, one map layer showing a map from the bird's eye perspective (courses and positions of streets, buildings, landscape features, etc.), for example. This corresponds to a map of a navigation system, for example. Another map layer includes, for example, a radar map, the surroundings features displayed by the radar map being stored together with a radar signature. Another map layer includes, for example, a LIDAR map, the surroundings features displayed by the LIDAR map being stored together with a LIDAR signature.

A surroundings sensor system of the first vehicle and/or a first and/or second and/or third surroundings sensor system(s) is/are at least one video sensor, at least one radar sensor, at least one LIDAR sensor, at least one ultrasonic sensor, and/or at least one further sensor(s) that is/are designed to detect the instantaneous and/or future surroundings of the first vehicle, in particular in the form of surroundings data values. In an example embodiment, the surroundings sensor system includes an evaluation unit, for example, that is designed, based on the surroundings data values, to determine and classify objects—for example at least one or multiple further vehicle(s)—in the instantaneous and/or future surroundings of the first vehicle.

The method according to the present invention advantageously achieves provision of a safe and comfortable passing maneuver for a first vehicle. A passing maneuver in particular represents an increased road risk, since the behavior of the vehicle to be passed as well as the potentially occurring oncoming traffic should be taken into account. This risk is minimized using the method in that possible passing maneuvers are simulated using a surroundings model and an idealized passing maneuver is subsequently provided, for example for the purpose of avoiding these risks.

The first data values are preferably transmitted by the first and/or second vehicle(s) or by a first infrastructure unit including a first surroundings sensor system, the first infrastructure unit being located in the instantaneous surroundings of the first vehicle.

This proves advantageous in that the used surroundings data values are detected in real time and directly on-site, whereby the surroundings model can be determined in a very up-to-date manner and can be correspondingly provided in a very up-to-date manner. This increases the safety of the idealized passing maneuver, since surprising and risk-maximizing events, among other things, can be minimized.

The surroundings data values are preferably transmitted by the first infrastructure unit and/or by the second infrastructure unit that includes a second surroundings sensor system located in the instantaneous surroundings of the first vehicle, and/or by a third infrastructure unit that includes a third surroundings sensor system that is located in the future surroundings of the first vehicle.

This proves advantageous in that the used surroundings data values are detected in real time and directly on-site, whereby the instantaneous and/or future surroundings model can be determined in a very up-to-date manner and can be correspondingly provided in a very up-to-date manner. This increases the safety of the idealized passing maneuver, since surprising and risk-maximizing events, among other things, can be minimized.

The first data values preferably include a first position of the first vehicle and/or a second position of the second vehicle and/or a first speed of the first vehicle and/or a second speed of the second vehicle, in particular as the relative speed with regard to the first vehicle.

This proves advantageous in that a reliable and in the sense of the method comprehensive surroundings model is rapidly determined due to fewer variables.

Preferably, the surroundings data values additionally represent an oncoming vehicle, the oncoming vehicle being located in the instantaneous and/or future surroundings of the first and/or second vehicle(s), the surroundings data values in particular representing a third position and/or a third speed of the oncoming vehicle.

This proves advantageous in that the risk of a passing maneuver is further minimized, since oncoming vehicles, in particular, represent a greatly increased safety hazard for all road users involved in a passing maneuver.

The oncoming vehicle is understood to mean a manually operated (designed according to SAE Level 0) or an automated vehicle (designed according to one of SAE Levels 1 through 5) (see SAE J3016 Standard).

A first and/or second and/or third position(s) is/are to be understood to mean coordinates within a predefined coordinate system, for example GNSS coordinates.

The second data values preferably include a first indication for a driver and/or an occupant of the first vehicle and/or a first trajectory for carrying out the idealized passing maneuver for the first vehicle.

This proves advantageous in that the safety of all involved road users is increased in that a driver and/or an occupant is/are warned or informed. Furthermore, the provision of a first trajectory represents a reliable and safe method, using which the first vehicle can carry out an idealized passing maneuver.

An additional step of providing third data values is preferably provided, the third data values including a second indication for a driver and/or an occupant of the second vehicle and/or a third indication for a driver and/or an occupant of the oncoming vehicle and/or a second trajectory for the second vehicle and/or a third trajectory for the oncoming vehicle.

An occupant of the first and/or second and/or oncoming vehicle(s) can be, for example, an individual who does not operate the particular vehicle manually, but is located within the particular vehicle, without being involved in controlling the particular vehicle. This applies, in particular, when the first and/or second and/or oncoming vehicle is/are designed as an automated vehicle.

The device according to the present invention, in particular a processing unit, is configured to carry out all steps of a method as described herein for determining an idealized passing maneuver.

In an example embodiment, the device is designed as a server or as a combination of servers (cloud), for example, that exchange data via a connection (for example the Internet).

A computer program is furthermore provided, including commands that prompt the computer to carry out a method according to a method as described herein for determining an idealized passing maneuver, when the computer program is carried out by a computer.

The device includes, for example, a processing unit (processor, random access memory, hard drive) as well as a suitable software (here, for example the computer program), in order to carry out the method. In an example embodiment, the device includes a transmitting and/or receiving unit that is designed to exchange data values, in particular with an external server or a cloud and/or a transmitting and/or receiving unit of a vehicle. In an example embodiment, the device includes a data interface that is designed to exchange data values, in particular with an external server or a cloud, using the transmitting and/or receiving unit included in the vehicle. Furthermore, the device for example includes an interface for requesting map data values that represent the digital map. In an example embodiment, the map is included in the device in that it is stored on the hard drive, for example.

Furthermore, a machine-readable memory medium is provided, on which the computer program is stored.

Advantageous refinements of the present invention are indicated in the description. In this regard, example embodiments of the present invention are illustrated in the drawings and explained in greater detail in the descriptions below.

DETAILED DESCRIPTION

Figure 1:
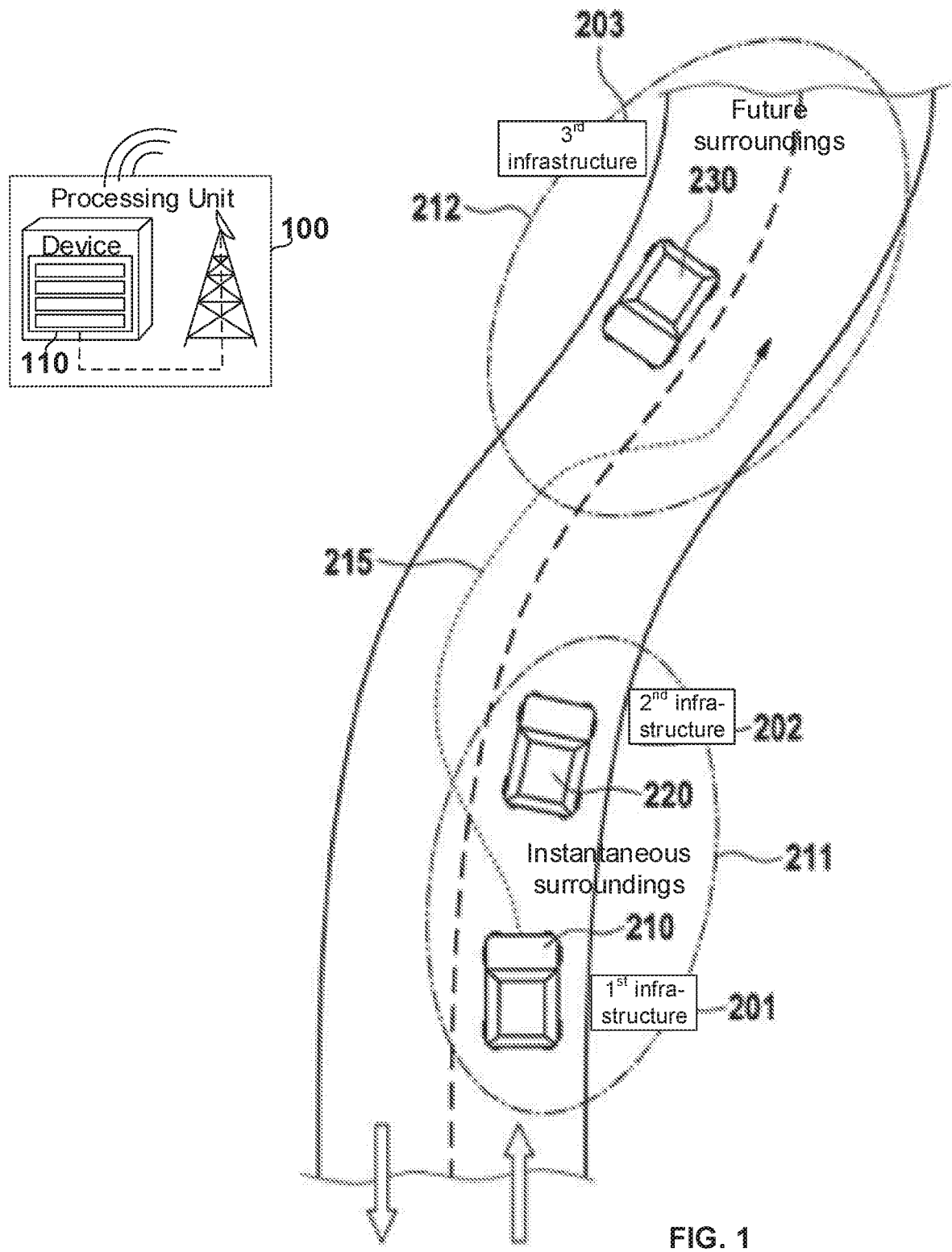
FIG. 1 shows an implementation of a method according to an example embodiment of the present invention.

FIG. 1 illustrates implementation of method 300. The size and length ratios, in particular the distances between shown vehicles 210, 220, 230 are not true to scale. Here, first vehicle 210 is, for example, on a traffic way—having one driving lane per driving direction—behind a second vehicle 220, which is moving in the same driving direction within instantaneous surroundings 211 of first vehicle 210, second vehicle 220 to be passed being passed by first vehicle 210 using an passing maneuver that has not been started yet in this case.

Furthermore, a processing unit 100 includes device 110 for carrying out method 300 for determining an idealized passing maneuver. A processing unit 100 is understood to mean a server, for example. In an example embodiment, a processing unit 100 is a cloud, i.e., a combination of at least two electrical data processing systems that exchange data via the Internet, for example. In an example embodiment, processing unit 100 corresponds to device 110.

Device 110 receives first data values that represent a passing maneuver of first vehicle 210. Subsequently, surroundings data values are requested and received that represent instantaneous and/or future surroundings 211, 212 of first vehicle 210 and/or of second vehicle 220. In an example embodiment, instantaneous surroundings 211 and future surroundings 212 overlap. The surroundings data values are detected here, for example, by a first infrastructure unit 201 that includes a first surroundings sensor system, and/or by a second infrastructure unit 202 that includes a second surroundings sensor system, and transmitted to device 110. For this purpose, first and/or second infrastructure unit(s) 201, 202 include(s), for example, transmitting and/or receiving units.

In an example embodiment, the surroundings data values additionally or alternatively represent an oncoming vehicle 230 that is located in future surroundings 212 of first vehicle 210 and/or of second vehicle 220 in this case. In this example embodiment, the surroundings data values are additionally received by a third infrastructure unit 203 that includes a third surroundings sensor system and that is located in future surroundings 212 of first vehicle 210, and transmitted using a transmitting and/or receiving unit of infrastructure unit 203.

Subsequently, a surroundings model of first vehicle 210 is determined as a function of the surroundings data values and based on a digital map that represents instantaneous and/or future surroundings 211, 212 of first vehicle 210 and/or of second vehicle 220.

Subsequently, an idealized passing maneuver for first vehicle 210 is determined as a function of the surroundings model for the purpose of carrying out the passing maneuver. This takes place, for example, in the form of a first trajectory 215, along which the idealized passing maneuver is carried out for first vehicle 210.

Subsequently, the idealized passing maneuver is provided or transmitted in the form of second data values that represent at least first trajectory 215 in this case, in such a way that first vehicle 210 is able to receive the second data values.

Subsequently, the passing maneuver is carried out.

In an example embodiment, the steps of method 300 according to the present invention are repeated cyclically, for example, until the passing maneuver has in fact been completed. In this way, it is possible to respond to possible changes (for example if second vehicle 220 and/or oncoming vehicle 230 accelerate(s) and/or brake(s) disproportionately strongly with regard to the predefined criteria) and to correspondingly adapt first trajectory 215.

Figure 2:
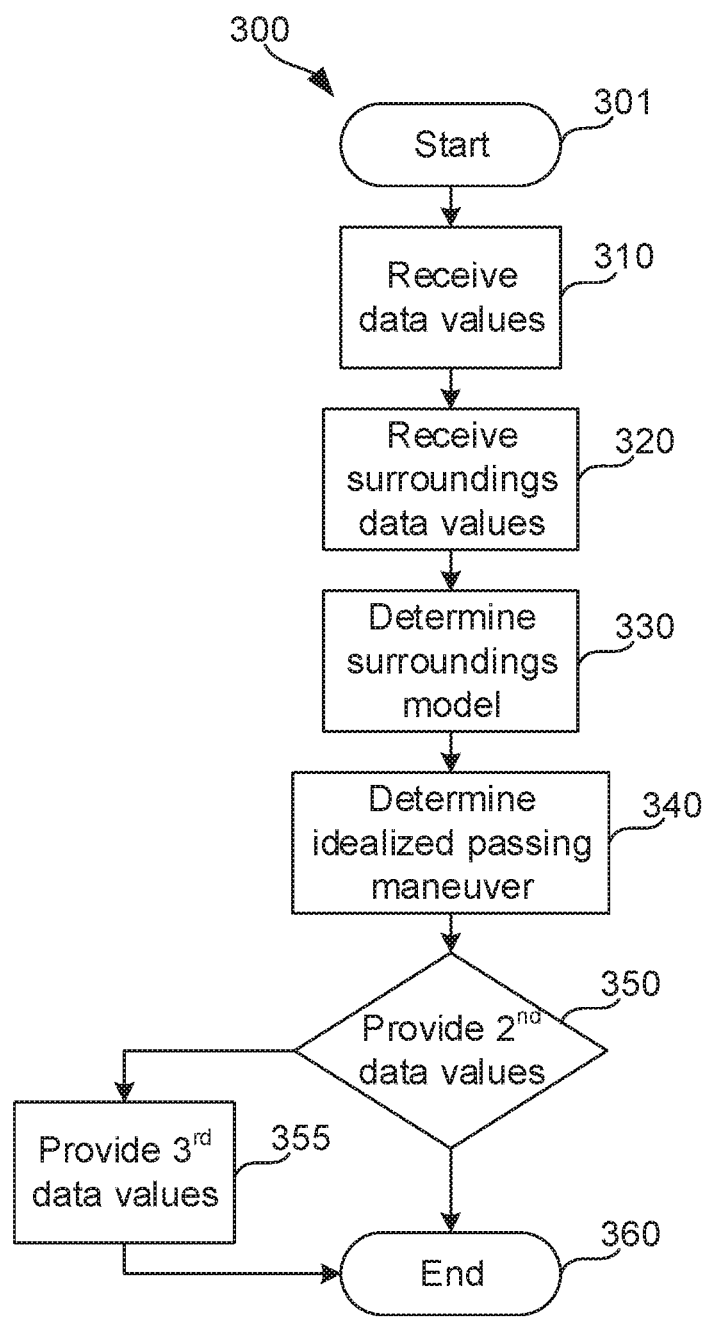
FIG. 2 is a flowchart that illustrates the method, according to an example embodiment of the present invention.

FIG. 2 shows an example embodiment of a method 300 for determining 340 an idealized passing maneuver. Method 300 starts in step 301.

In step 310, first data values that represent a passing maneuver by a first vehicle 210, are received, a second vehicle 220 to be passed being passed using the passing maneuver.

In step 315, surroundings data values are requested that represent instantaneous and/or future surroundings 211, 212 of first vehicle 210 and/or of second vehicle 220.

In step 320, these requested surroundings data values are received.

In step 330, a surroundings model of first vehicle 210 is determined as a function of the surroundings data values and based on a digital map that represents instantaneous and/or future surroundings 211, 212 of first vehicle 210 and/or second vehicle 220.

In step 340, the idealized passing maneuver for first vehicle 210 for carrying out the passing maneuver is determined as a function of the surroundings model.

In step 350, the idealized passing maneuver is provided in the form of second data values in such a way that first vehicle 210 is able to receive the second data values. In an example embodiment, step 360 follows. In an example embodiment, step 355 follows, for example.

In step 355, third data values are provided, the third data values including a second indication for a driver and/or an occupant of second vehicle 220 and/or a third indication for a driver and/or an occupant of an oncoming vehicle 230 and/or a second trajectory for second vehicle 220 and/or a third trajectory for oncoming vehicle 230.

Method 300 ends in step 360.

What is claimed is:

1. A method for determining an idealized passing maneuver, the method comprising:
   receiving first data values that represent a passing maneuver by a first vehicle to pass a second vehicle;
   requesting and receiving surroundings data values that represent instantaneous and/or future surroundings of the first vehicle and/or of the second vehicle;
   determining a surroundings model of the first vehicle based on the surroundings data values and based on a digital map that represents the instantaneous and/or future surroundings of the first vehicle and/or second vehicle;
   determining the idealized passing maneuver for the first vehicle for carrying out the passing maneuver based on the surroundings model; and
   providing the idealized passing maneuver in the form of second data values in a form by which the second data values are receivable by the first vehicle;
   minimizing a passing maneuver risk by simulating multiple passing maneuvers using the surroundings model to determine the idealized passing maneuver which is provided to avoid and/or reduce the passing maneuver risk,
   wherein the surroundings data values include an oncoming vehicle, which is located in the instantaneous and/or future surroundings of the first and/or second vehicle(s), and wherein the representation of the oncoming vehicle represents a position and/or a speed of the oncoming vehicle, wherein the instantaneous surroundings include a predefined area having a minimum size around the first vehicle and/or an area along the traffic way, on which the idealized passing maneuver is carried out, wherein the future surroundings are the surroundings that the first vehicle will drive through in the course of the passing maneuver, which is determined as a function of a first speed of the first vehicle, and wherein the future surroundings correspond to an area in which the passing maneuver is completed, and wherein the future surroundings are the surroundings that are detectable by a third infrastructure unit using a third surroundings sensor system, and wherein the digital map includes multiple map layers, including a map layer showing a map from a bird's eye perspective, another map layer that includes a radar map, in which the surroundings features displayed by the radar map are stored together with a radar signature.

2. The method of claim 1, wherein the first data values are transmitted by the first vehicle and/or by the second vehicle.

3. The method of claim 1, wherein the first data values are transmitted by a first infrastructure unit that includes a first surroundings sensor system and that is located in the instantaneous surroundings of the first vehicle.

4. The method of claim 3, wherein the surroundings data values are transmitted by the first infrastructure unit.

5. The method of claim 3, wherein the surroundings data values are transmitted by a second infrastructure unit that includes a second surroundings sensor system and that is located in the instantaneous surroundings of the first vehicle.

6. The method of claim 1, wherein the surroundings data values are transmitted by an infrastructure unit that includes a surroundings sensor system and that is located in a future surroundings of the first vehicle.

7. The method of claim 1, wherein the first data values include a first position, which is of the first vehicle, a second position, which is of the second vehicle, a first speed, which is of the first vehicle, and/or a second speed, which is of the second vehicle.

8. The method of claim 7, wherein the first data values include the second speed, and the second speed is of the second vehicle relative to the first speed.

9. The method of claim 1, wherein the second data values include a first indication for an occupant of the first vehicle and/or a first trajectory for carrying out the idealized passing maneuver for the first vehicle.

10. The method of claim 1, further comprising:
providing third data values that include an indication for an occupant of the second vehicle, an indication for an occupant of an oncoming vehicle, and/or a trajectory for the second vehicle and/or a trajectory for the oncoming vehicle.

11. A device for determining an idealized passing maneuver, comprising:
a processor configured to perform the following:
receiving first data values that represent a passing maneuver by a first vehicle to pass a second vehicle;
requesting and receiving surroundings data values that represent instantaneous and/or future surroundings of the first vehicle and/or of the second vehicle;
determining a surroundings model of the first vehicle based on the surroundings data values and based on a digital map that represents the instantaneous and/or future surroundings of the first vehicle and/or second vehicle;
determining the idealized passing maneuver for the first vehicle for carrying out the passing maneuver based on the surroundings model; and
providing the idealized passing maneuver in the form of second data values in a form by which the second data values are receivable by the first vehicle;
minimizing a passing maneuver risk by simulating multiple passing maneuvers using the surroundings model to determine the idealized passing maneuver which is provided to avoid and/or reduce the passing maneuver risk,
wherein the surroundings data values include an oncoming vehicle, which is located in the instantaneous and/or future surroundings of the first and/or second vehicle(s), and wherein the representation of the oncoming vehicle represents a position and/or a speed of the oncoming vehicle,
wherein the instantaneous surroundings include a predefined area having a minimum size around the first vehicle and/or an area along the traffic way, on which the idealized passing maneuver is carried out,
wherein the future surroundings are the surroundings that the first vehicle will drive through in the course of the passing maneuver, which is determined as a function of a first speed of the first vehicle, and wherein the future surroundings correspond to an area in which the passing maneuver is completed, and wherein the future surroundings are the surroundings that are detectable by a third infrastructure unit using a third surroundings sensor system, and
wherein the digital map includes multiple map layers, including a map layer showing a map from a bird's eye perspective, another map layer that includes a radar map, in which the surroundings features displayed by the radar map are stored together with a radar signature.

12. A non-transitory computer-readable medium, on which are stored instructions, which are executable by a processor, comprising:
a program code arrangement having program code for determining an idealized passing maneuver, by performing the following:
receiving first data values that represent a passing maneuver by a first vehicle to pass a second vehicle;
requesting and receiving surroundings data values that represent instantaneous and/or future surroundings of the first vehicle and/or of the second vehicle;
determining a surroundings model of the first vehicle based on the surroundings data values and based on a digital map that represents the instantaneous and/or future surroundings of the first vehicle and/or second vehicle;
determining the idealized passing maneuver for the first vehicle for carrying out the passing maneuver based on the surroundings model; and
providing the idealized passing maneuver in the form of second data values in a form by which the second data values are receivable by the first vehicle;
minimizing a passing maneuver risk by simulating multiple passing maneuvers using the surroundings model to determine the idealized passing maneuver which is provided to avoid and/or reduce the passing maneuver risk,
wherein the surroundings data values include an oncoming vehicle, which is located in the instantaneous and/or future surroundings of the first and/or second vehicle(s), and wherein the representation of the oncoming vehicle represents a position and/or a speed of the oncoming vehicle, wherein the instantaneous surroundings include a predefined area having a minimum size around the first vehicle and/or an area along the traffic way, on which the idealized passing maneuver is carried out, wherein the future surroundings are the surroundings that the first vehicle will drive through in the course of the passing maneuver, which is determined as a function of a first speed of the first vehicle, and wherein the future surroundings correspond to an area in which the passing maneuver is completed, and wherein the future surroundings are the surroundings that are detectable by a third infrastructure unit using a third surroundings sensor system, and wherein the digital map includes multiple map layers, including a map layer showing a map from a bird's eye perspective, another map layer that includes a radar map, in which the surroundings features displayed by the radar map are stored together with a radar signature.

\* \* \* \* \*